United States Patent [19]

Hussey

[11] Patent Number: 4,585,659

[45] Date of Patent: Apr. 29, 1986

[54] PROCESS FOR PRESERVING SEAFOOD

[76] Inventor: Edwin S. Hussey, 43 Newman St., St. John's, Newfoundland, Canada, A1E 4W2

[21] Appl. No.: 643,009

[22] Filed: Aug. 22, 1984

[30] Foreign Application Priority Data

Oct. 13, 1983 [CA] Canada .................................. 438925

[51] Int. Cl.⁴ ......................... A22C 25/00; A23B 4/14

[52] U.S. Cl. .................................... 426/332; 426/574; 426/643

[58] Field of Search ........................ 426/332, 574, 643

[56] References Cited

U.S. PATENT DOCUMENTS

| | | | |
|---|---|---|---|
| 359,438 | 7/1936 | Seltzer . | |
| 2,567,085 | 9/1951 | Stoloff . | |
| 2,763,557 | 9/1956 | Helgerud et al. . | |
| 2,839,410 | 6/1958 | Helgerud et al. . | |
| 3,519,434 | 7/1970 | Schuppner, Jr. . | |
| 3,833,744 | 9/1974 | Bomstein | 426/643 X |
| 3,881,031 | 4/1975 | Glicksman et al. | 426/332 X |
| 4,219,582 | 8/1980 | Cheng . | |
| 4,313,967 | 2/1982 | Kahn et al. . | |
| 4,478,859 | 10/1984 | Fox, Jr. | 426/332 X |

FOREIGN PATENT DOCUMENTS

| | | | |
|---|---|---|---|
| 702639 | 1/1965 | Canada . | |
| 743045 | 9/1966 | Canada . | |
| 943807 | 3/1974 | Canada . | |
| 969417 | 6/1975 | Canada . | |
| 1053066 | 4/1979 | Canada . | |
| 1064763 | 10/1979 | Canada . | |
| 0079058 | 7/1978 | Japan | 426/643 |
| 0009674 | 1/1983 | Japan | 426/643 |
| 0000309 | 1/1983 | Japan | 426/574 |

OTHER PUBLICATIONS

Chemical Abstracts, vol. 88 (1978) 135045f.
Chemical Abstracts, vol. 88 (1978) 135046g.
Chemical Abstracts, vol. 88 (1978) 135050d.
Chemical Abstracts, vol. 88 (1978) 135051e.
Chemical Abstracts, vol. 88 (1978) 135061h.
Chemical Abstracts, vol. 88 (1978) 135067q.
Chemical Abstracts, vol. 88 (1978) 135068r.
Chemical Abstracts, vol. 88 (1978) 49260r.
Chemical Abstracts, vol. 94 (1981) 101661n.

*Primary Examiner*—Robert Yoncoskie
*Attorney, Agent, or Firm*—Parkhurst & Oliff

[57] ABSTRACT

The invention disclosed herein provides a process for preserving frozen seafood such as comminuted crab meat, fish and shellfish without requiring the use of sodium tripolyphosphate, which comprises adding to processed seafood prior to freezing from about 0.001% to about 1.0% by weight, based on the seafood, of a Xanthomonas hydrophilic colloid such as Xanthan gum. The seafood so treated exhibits reduced cold storage deterioration and improved retention of natural moisture.

16 Claims, No Drawings

PROCESS FOR PRESERVING SEAFOOD

The present invention relates to the preservation of frozen seafood, and more particularly, to the preservation of frozen crab meat.

Numerous processes for preserving frozen prepared food, frozen fish, meats, dairy products, etc. are known, and have been used. Seafood has customarily been preserved when in cold storage by adding to it small amounts of sodium tripolyphosphate, to retain natural moisture, and to prevent or at least reduce, cold storage deterioration. Hydrophilic colloids such as seaweed extracts, carboxymethyl cellulose, and various natural gums have also been used in the preservation of foodstuffs. For example:

U.S. Pat. No. 2,567,085 (Stoloff) teaches a process in which the storage life of frozen fish is extended by dipping the fish, prior to freezing, in a coating solution containing an extract of Rhodophyceae (seaweed) and ascorbic acid. The seaweed extract would probably contain polysaccharides of the type known generally as agar and/or algin.

U.S. Pat. No. 2,839,410 (Helgerud et al) is also concerned with the preservation of frozen fish (shrimp also is mentioned). According to Helgerud's process fish is placed in a sodium chloride solution which is thickened by adding thereto about 1.5%–4% of a water soluble hydrocolloid such as alginate, agar, polyvinylalcohol, carob bean flour, carboxymethyl cellulose or carrageenin.

Helgerud et al describe in U.S. Pat. No. 2,763,557, granted Sept. 18, 1956, a method of preserving foodstuffs such as fish, shellfish and meat by block freezing. The unfrozen foodstuff is placed in an aqueous fluid solution of an alginate and a gelatinizing agent such as a water-soluble inorganic salt or a water-soluble organic compound to form a solid block composed of the foodstuff and a gel, and the solid block is subsequently frozen.

Canadian Pat. No. 702,639, issued Jan. 26, 1965, discloses a meat product with less than 7% moisture, containing at least 2.5% of an edible colloid such as gelatin, starch or gums. The meat may be fish. The meat is dried by first cooking pieces of it in a solution containing at least 0.5% of the edible colloid, separating the meat pieces from the solution, and drying them by the application of dry heat.

According to Canadian Pat. No. 359,438, dated July 28, 1936, an emulsified food product (cottage cheese, ice cream, cheeses, salad dressing, etc.) is stabilized with a small quantity of locust bean gum and gum karaya or a chondros type of seaweed, or purified Irish moss.

Winterberg discloses in Canadian Pat. No. 743,045 the treatment of comestibles such as fruit, raisins and nuts with pectic substances, vegetable gums, etc., to prolong their storage life.

Canadian Pat. No. 943,807 discloses a frozen confectionery product coated with a gel based on a water-soluble polysaccharide.

Canadian Pat. No. 969,417 is concerned with low calorie toppings, spreads or frozen deserts which contain a polyglycerol ester as foaming agent, and as a stabilizer, a hydrophilic colloid.

An objective of the present invention is the preservation of frozen seafood, and in particular, frozen comminuted seafood by retaining its natural moisture and reducing cold storage deterioration.

Another objective of this invention is to preserve frozen seafood without the necessity of using sodium tripolyphosphate.

These objectives are attained by incorporating in the seafood, and in a more specific aspect, crab meat, small specified amounts of a Xanthomonas hydrophilic colloid.

The Xanthomonas hydrophilic colloids employed in my invention are colloidal materials which are produced by bacteria of the genus Xanthomonas. Illustrative of such colloidal materials is the hydrophilic colloid produced by the bacterium *Xanthomonas campestris* and commonly known as Xanthan gum. This colloidal material is a polymer containing mannose, glucose, potassium glucuronate and acetyl radicals. In such a colloid, the potassium portion can be replaced by several other cations without substantial change in the property of the said material for the purpose of the present invention. The said colloid, which is a high molecular weight, exocellular material, may be prepared by the bacterium *Xanthomonas campestris*, by whole culture fermentation of a medium containing 2–5% commercial glucose, an organic nitrogen source, dipotassium hydrogen phosphate and appropriate trace elements. The incubation time is approximately 96 hours at 28° C., aerobic conditions. In preparing the colloid as aforesaid, it is convenient to use corn steep liquor or distillers' dry solubles as an organic nitrogen source. It is expedient to grow the culture in two intermediate stages prior to the final inoculation in order to encourage vigorous growth of the bacteria. These stages may be carried out in media having a pH of about 7. In a first stage a transfer from an agar slant to a dilute glucose broth may be made and the bacteria cultured for 24 hours under vigorous agitation and aeration at a temperature of about 30° C. The culture so produced may then be used to inoculate a higher glucose (3%) content broth of larger volume in a second intermediate stage. In this stage the reaction may be permitted to continue for 24 hours under the same conditions as the first stage. The culture so acclimated for use with glucose by the aforementioned first and second stages is then added to the final glucose medium. In the aforesaid method of preparation of *Xanthomonas campestris* hydrophilic colloid, a loopful of organism from the agar slant is adequate for the first stage comprising 200 milliliters of the said glucose media. In the second stage the material resulting from the first stage may be used together with 9 times its volume of a 3% glucose media. In the final stage the material produced in the second stage may be admixed with 19 times its volume of the final media. A good final media may contain 3% glucose, 0.5% distillers' dry solubles, 0.5% dipotassium phosphate, 0.1% magnesium sulphate having 7 molecules of water of crystallization and water. The reaction in the final stage may be satisfactorily carried out for 96 hours at 30° C. with vigorous agitation and aeration. The resulting *Xanthomonas campestris* colloidal material which we have found to be particularly suitable for the purpose of the present invention can be recovered by precipitation in methanol of the clarified mixture from the fermentation. This resulting material may also be designated as a pseudoplastic, heteropolysaccharide hydrophilic colloid or gum produced by the bacterium species *Xanthomonas campestris*.

Other Xanthomonas colloidal materials may be prepared by repeating the procedure used for producing the *Xanthomonas campestris* colloidal material described above by substituting known Xanthomonas bacteria or organisms, i.e., *Xanthomonas corotae, Xanthomonas incanae, Xanthomonas begoniae,* and *Xanthomonas malvacearum,* for the bacterium *Xanthomonas campestris.*

Xanthan gum, which is also known as Polysaccharide B-1459, and sold commercially under the trademarks "Keltrol F" and "Kelzan", is a cream-colored, odorless, free-flowing powder, which dissolves readily in water with stirring to give highly viscous solutions at low concentrations. It has been used to some extent in foods and cosmetics as a stabilizer.

Kahn et al disclose in U.S. Pat. No. 4,313,967 the use of Xanthan gum as a conventional freeze-thaw stabilizer in intermediate moisture foods. Although there is an extensive disclosure, and numerous foodstuffs are mentioned, seafoods do not appear to be included among such foodstuffs. The "intermediate-moisture frozen foods" which Kahn et al are concerned with are batters, toppings, creams, puddings, sauces and beverage concentrates. The expression "intermediate-moisture frozen foods" which is used in this patent would apparently broadly cover meat and fish products, but there is no specific disclosure of such products in the Kahn et al patent, and in particular there is no specific disclosure therein of seafood such as crab-meat.

Canadian Pat. Nos. 943,807 and 969,417, U.S. Pat. Nos. 3,996,389 and 4,219,582, and British Pat. Nos. 1,324,557 and 1,458,946 describe the use of Xanthan gum as a stabilizer for various food products, but always in combination with another gum such as guar gum or locust bean gum or a hydrophilic colloid such as an alginate; and there is apparently some co-action or synergistic relationship between the two or more different types of gums or hydrophilic colloids used as stabilizers. Moreover, none of the above references relates to the preservation of seafood, and in particular, none of said references is concerned with the preservation of frozen carb meat.

According to one aspect of the present invention there is provided a process for preserving seafood which comprises adding to processed seafood a Xanthomonas hydrophilic colloid in an amount ranging from about 0.001% up to about 1.0% by weight of said seafood.

This invention, in another aspect, provides a seafood product having reduced cold storage deterioration and improved retention of natural moisture, said product comprising processed seafood admixed with from about 0.001% to about 1.0% by weight of said seafood, of a Xanthomonas hydrophilic colloid.

The Xanthan gum (or other Xanthomonas hydrophilic colloid) is added to the seafood prior to freezing.

The amount of Xanthomonas hydrophilic colloid which is added to the seafood may range from about 0.001% to about 1.0% by weight. Preferably, said colloid is used in an amount ranging from about 0.02% to about 0.5%, and still more preferably, in an amount of from about 0.02% to about 0.05%, by weight of the seafood.

The present invention if applicable to seafoods generally, in comminuted minced finely divided, macerated or extruded form, and/or in a form wherein the flesh is broken up into finer particles or compressed to alter its integrity of shape or size. While in a preferred embodiment of the invention the seafood is comminuted crab meat, the invention is not limited to crab meat, but is applicable generally to shellfish, crustaceans, salt water fish and fresh water fish. The term "seafood", as used in this specification, is therefore intended to include fish of all types as well as crustaceans and shellfish when used or intended to be used as food.

Our experiments have shown that Xanthan gum ("Keltrol F") when added to comminuted cooked crab meat, prior to freezing, in concentrations ranging from about 0.02% up to about 0.5%, will retain moisture in the comminuted crab meat so that drip loss ranges from 0% up to a maximum of about 3.5% in the finished frozen and thawed pack. The drip loss from selected samples are as follows:

With 0.058% added "Keltrol F" the drip loss observed was 0%; with 0.037% "Keltrol F" added the drip loss observed was 0.57%; with 0.025% "Keltrol F" added the drip loss observed was 1.1%; and with 0.019% "Keltrol F" added the observed drip loss was 3.5%. In all cases the "drip loss" was in terms of percentage of moisture content of the sample.

In the drawings appended to this specification:

FIG. 1 is a graph illustrating moisture retention of frozen minced crab meat with varying amounts of Xanthan gum added thereto: and FIG. 2 is a graph illustrating moisture retention of frozen minced code fillet with varying amounts of Xanthan gum added thereto.

The present invention is further described by the following illustrative example.

PROCESS EXAMPLE

EXPERIMENT

The effect of Xanthan gum on minced seafood.

Purpose:

To determine the effect of concentrations of Xanthan gum on the water retention of minced crab and minced cod fillet under the experimental conditions.

Materials:

Solutions of Xanthan gum in water prepared to give final concentrations as depicted in FIGS. 1 and 2 of the drawings when added in the ratio of one part Xanthan gum solution to thirty parts of minced seafood flesh.

The crab meat was unfrozen commercially recovered (processed) flesh and the cod fillet was minced for this experiment from consumer available frozen approximately 0.4 kilogram pack of undeterminate storage age.

Procedure:

3.3 milliliters of an appropriate concentration of Xanthan gum solution as depicted in the Figures was added to 100 grams of crab or cod flesh. Then the seafood was commercially frozen, stored, thawed at not greater than 25° C. and the drip loss determined before (control) and after processing. The results are illustrated in FIGS. 1 and 2 of the drawings attached hereto.

Discussion:

It is apparent from the drawings that Xanthan gum does exert an observable effect on the drip loss of untreated sample compared to treated samples. In our experimental documentation information indicates that foodstuffs from fresh and salt water sources losing more than 20% moisture as drip loss may be preserved by the addition of varying percentages of Xanthan gum solutions depending on the source of the raw material, its physical condition, its quality relating to age and holding conditions, and its in-plant handling.

What I claim is:

1. A process for preparing a preserved frozen seafood having reduced cold storage deterioration and improved retention of natural moisture consisting essentially of:

admixing with seafood a Xanthomonas hydrophilic colloid as the sole preservative agent in an amount ranging from about 0.001% to about 1.0% by weight of said seafood and freezing said seafood.

2. A process according to claim 1, wherein the seafood is comminuted crab meat.

3. A process according to claim 1, wherein said Xanthomonas hydrophilic colloid is employed in an amount ranging from about 0.02% to about 0.5% by weight of said seafood.

4. A process according to claim 1, wherein said Xanthomonas hydrophilic colloid is employed in an amount ranging from about 0.02% to about 0.05% by weight of said seafood.

5. A process according to any of claim 1, wherein the Xanthomonas hydrophilic colloid is a product obtained by fermentation of glucose by a bacterium *Xanthomonas campestris.*

6. A process according to claim 1, wherein said seafood is shellfish.

7. A process according to claim 1, wherein said seafood is salt water fish.

8. A process according to claim 1, wherein said seafood is fresh water fish.

9. A preserved frozen seafood product having reduced cold storage deterioration and improved retention of natural moisture, consisting essentially of:

a seafood admixed with a Xanthomonas hydrophilic colloid as the sole preservative agent in an amount of about 0.001% to about 1.0% by weight of said seafood.

10. A product according to claim 9, wherein the seafood is comminuted crab meat.

11. A product according to claim 9, wherein said Xanthomonas hydrophilic colloid is present in an amount of from about 0.02% to about 0.5% by weight of said seafood.

12. A product according to claim 9, wherein said Xanthomonas hydrophilic colloid is present in an amount of from about 0.02% to about 0.05% by weight of said seafood.

13. A seafood product as defined in claim 9, wherein the Xanthomonas hydrophilic colloid is a product obtained by the fermentation of glucose by a bacterium *Xanthomonas campestris.*

14. A seafood product as defined in claim 9, wherein the seafood is shellfish.

15. A seafood product as defined in claim 9, wherein the seafood is salt water fish.

16. A seafood product as defined in claim 9, wherein the seafood is fresh water fish.

* * * * *